Figure 5:
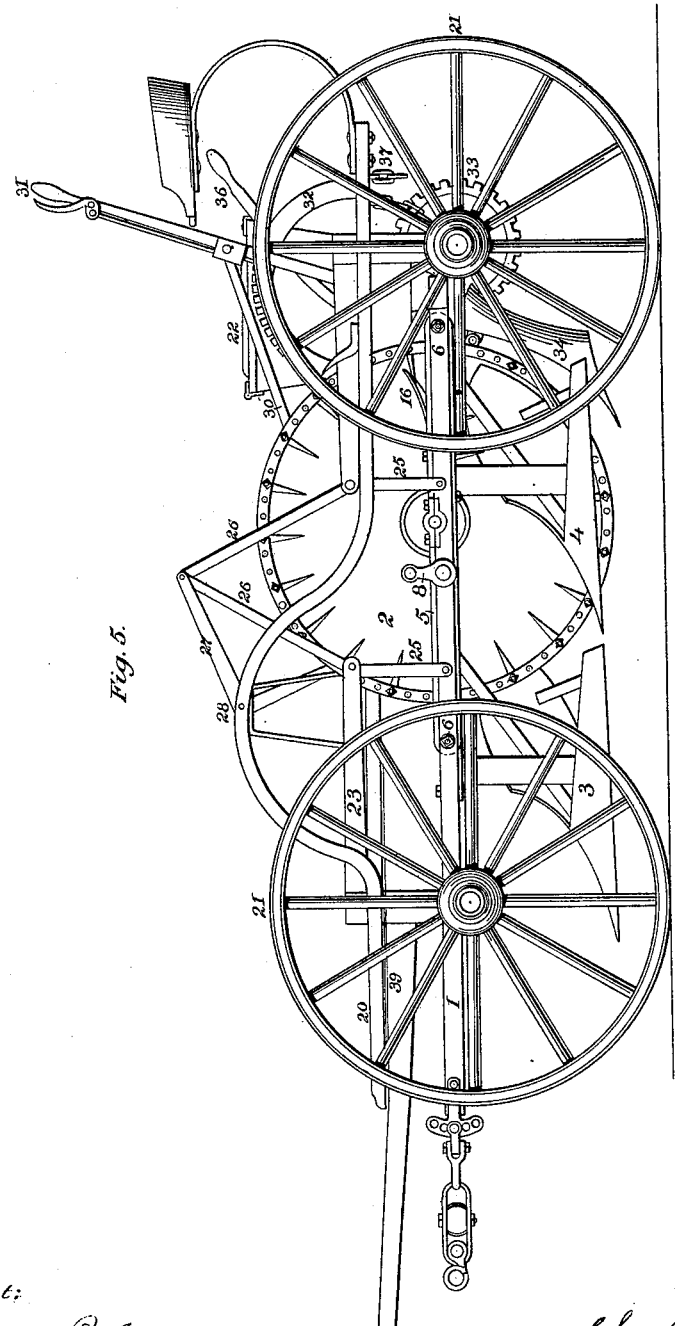

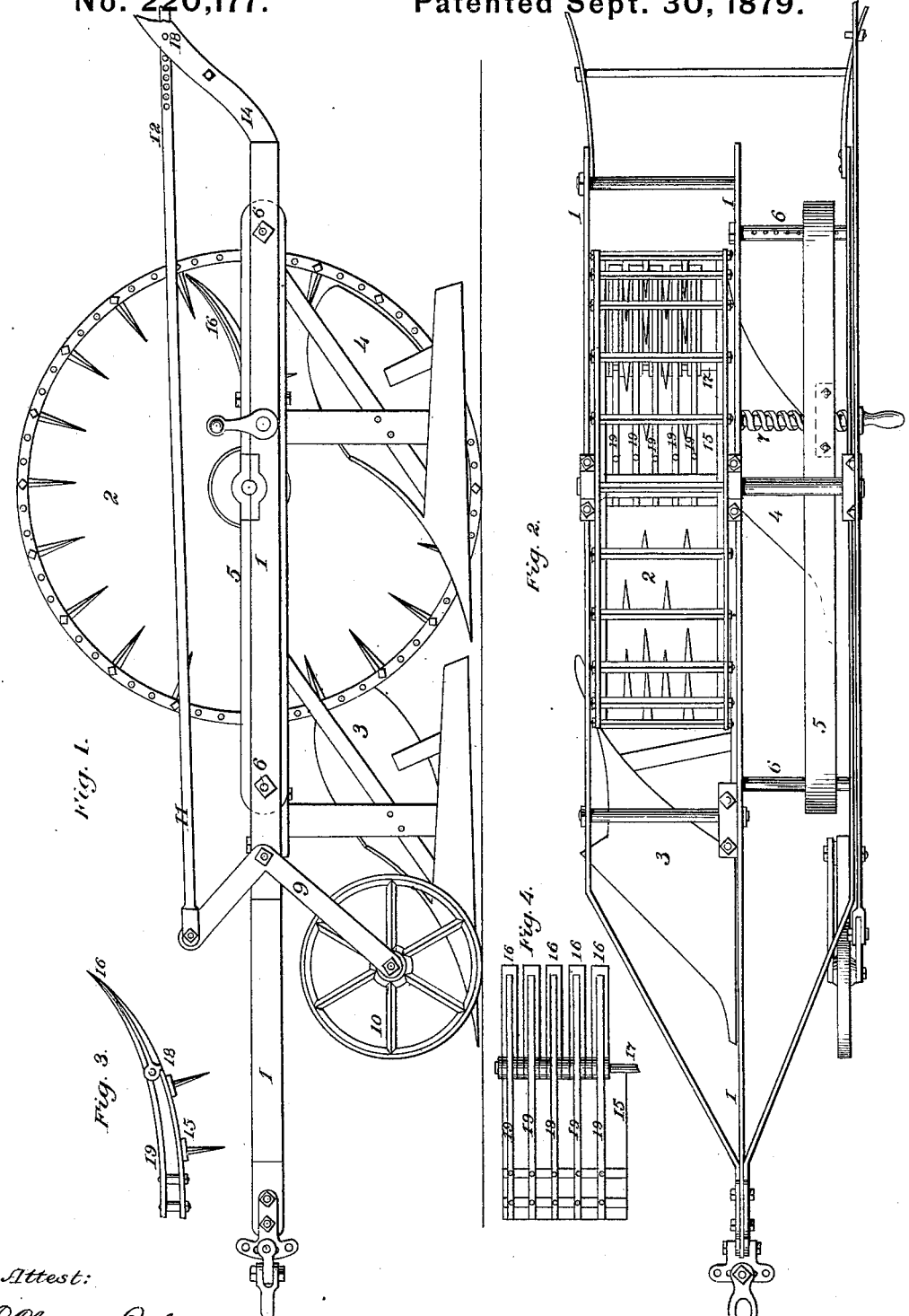

4 Sheets—Sheet 2.

C. E. SACKETT.
Combined Plow, Harrow, and Seed-Drill.

No. 220,177. Patented Sept. 30, 1879.

Attest:
Clarence Poole
Warren Seely

Inventor:
Charles E. Sackett,
by Ellis Spear
Atty

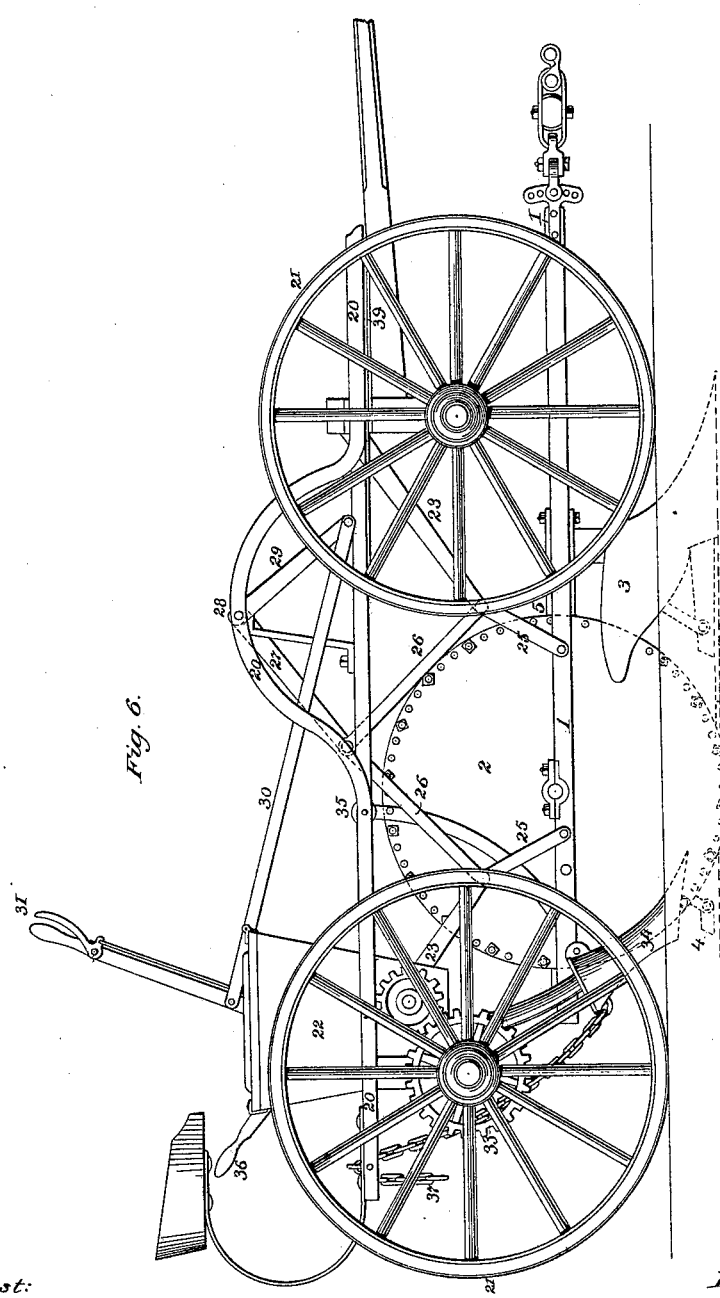

C. E. SACKETT.
Combined Plow, Harrow, and Seed-Drill.
No. 220,177. Patented Sept. 30, 1879.
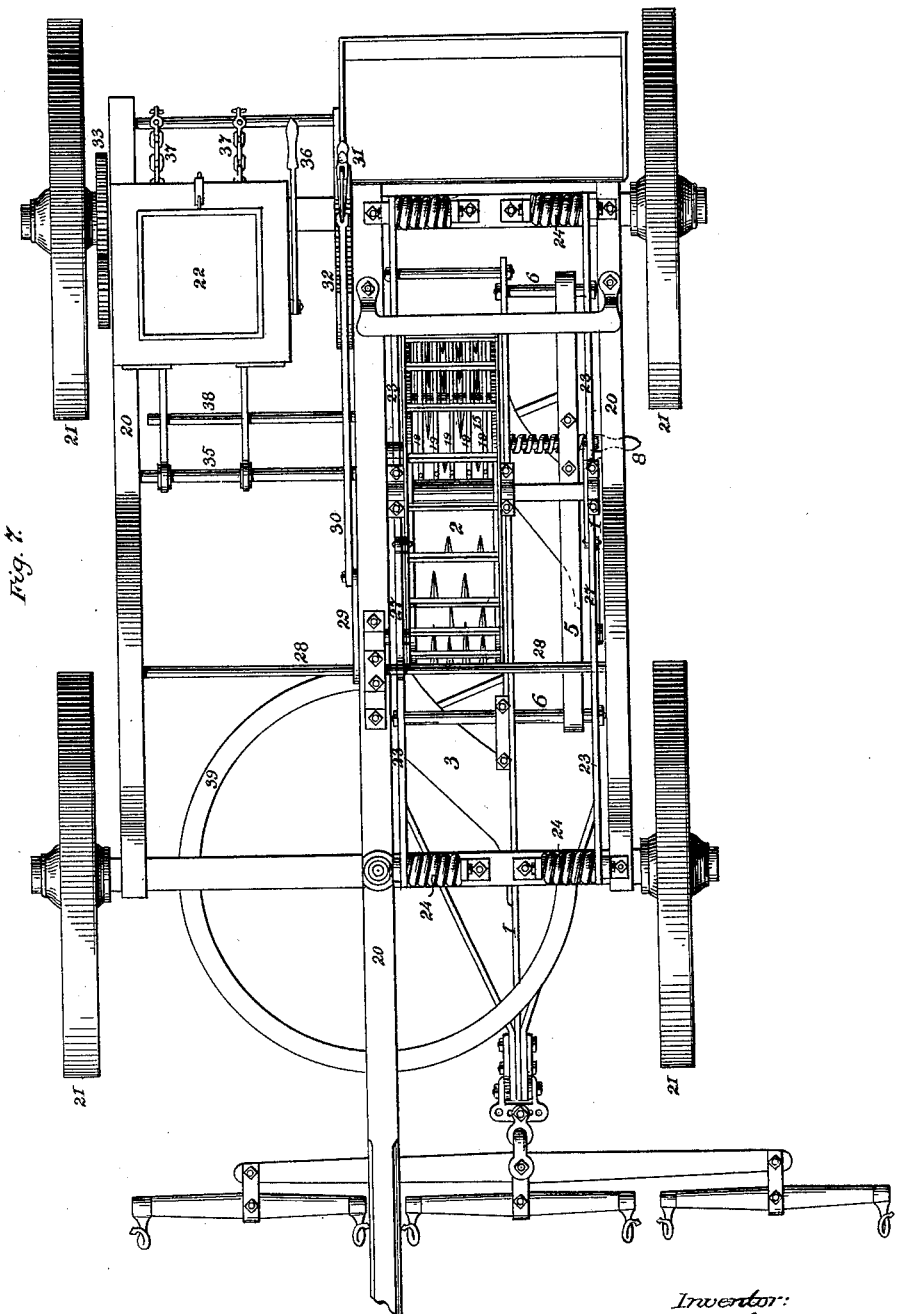

UNITED STATES PATENT OFFICE.

CHARLES E. SACKETT, OF MATILDA FURNACE, WAYNE TOWNSHIP, MIFFLIN COUNTY, PENNSYLVANIA.

IMPROVEMENT IN COMBINED PLOW, HARROW, AND SEED-DRILL.

Specification forming part of Letters Patent No. 220,177, dated September 30, 1879; application filed August 13, 1879.

*To all whom it may concern:*

Be it known that I, CHARLES E. SACKETT, of Matilda Furnace, Wayne township, Mifflin county, and State of Pennsylvania, have invented certain new and useful Improvements in the Construction of Combined Plow, Harrow, and Seed-Drill Implements, and in devices for transporting and manipulating the same; and I do hereby declare that the following specification, in connection with the accompanying drawings, is a full, clear, and exact description of my invention, and such as will enable others skilled in the art to which it pertains to make and use the same, reference being had to the accompanying drawings, which form part of this specification.

My invention consists in the application of the parts and the details of the construction and combination thereof, as will be hereinafter more specifically set forth, for the purpose of accomplishing the different processes of plowing, harrowing, and sowing seed by one implement, and in one continuous and simultaneous operation, in place of the various processes and various implements now in use to accomplish the same end.

In the accompanying drawings, similar figures of reference indicate like parts.

Figure 1 is a side elevation of the combined plow and harrow. Fig. 2 is a plan view of the same. Figs. 3 and 4 are an elevation and plan view of the pulverizing-shield and cleaning finger-bars detached. Fig. 5 is an elevation, above ground, of the combined plow, harrow, and seed-drill. Fig. 6 is a reversed elevation, and showing the implement in the earth. Fig. 7 is a plan view of the same.

The main features of the implement having been embodied in a previous application, this specification will refer more particularly to the improved methods of construction and handling.

To a suitable frame, 1 1 1, are attached the wheel-harrow or pulverizing apparatus 2, the clearing or furrow plow 3, and the land-plow 4. The land-plow 4 is secured by the usual bolts and braces to a sliding beam, 5, which slides upon the rod-bolts 6 6 at either end, and is actuated to or from the harrow by the screw 7 and the crank-handle 8. By this means a variation of the width of the cut of the land thrown into the harrow is obtained, and the proportion may be adjusted to the toughness of the land or the strength of the team employed.

The land-plow's mold-board is made to conform to the inner periphery of the harrow, thus closing into it as far as may be desired.

The rear sliding rod-bolt 6 is fitted with a series of holes, in which may be dropped a pin at either side of the beam, and a turn of the screw will give a set to the land-plow point to or from the land.

At a convenient point on the frame 1 1 1 is attached, by the angle-bar 9, the wheel 10, which is moved up or down by the rod 11, and held in position at any one of the holes 12 by the pin 13, secured in the handles 14. By this means the wheel, when lowered, in conjunction with the wheel-harrow, forms supports, on which the implement, when used as a hand walking implement, may be moved from point to point in the fields or on good roads at pleasure. When raised, the wheel serves to regulate the depth of cut of both plows.

The wheel-harrow 2 is provided with holes about an inch apart on each circular rim, through which the removable cross-bars provided with the harrowing-teeth are bolted. The operator can thus adjust the width of opening to the condition of the land or the strength of the team employed by putting the removable bars in any of the bolt-holes at pleasure, or he can replace or remove with ease the teeth for sharpening or other purposes.

The pulverizing-shield 15 is shown in elevation and plan, detached, for the purpose of indicating more particularly improvements in its construction. The pulverizing-plate 15 is connected about midway to a series of finger-bars, 16 16 16, by a common hinge-bolt, 17, which also holds the shield securely, in connection with other bolts, to the frame 1 1 1. The finger-bars are spaced just sufficiently far apart to allow the harrowing-teeth to pass upward between them. They are prevented from falling by the stops 18, and are kept down to resist the upward passage of the earth by the flat springs 19 19 19. These springs, while resisting the passage of the earth, will give back before a stone or block of wood or other obstruction that cannot be crushed, and allow it to pass before breaking the teeth or checking the implement. They can be adjusted to any amount of resistance to the pressure of the earth.

Figs. 5, 6, and 7: To a convenient carriage-frame, 20 20 20, supported upon wheels 21, is hung upon one side of the central reach the combined plow and harrow, and upon the other side the seed-drill 22.

The combined plow and harrow is supported and held in place by four principal lever-bars, 23, starting from the carriage-bolsters at either side and end of the plow and harrow frame, at which end they are secured to the bolsters by a bolt encircled by a spiral spring, 24, which spring actuates the lever, and is also secured to the bolster. The other end of each lever is secured to the plow and harrow frame by the shackle-bars 25, and in such position as to hold it in proper balance, but without disturbing its independence as a plowing-frame, and leaving it free to be adjusted as to movement by the draft-clevis in front having the necessary rocking motion on the shackle-bars. The same end of the principal levers is also attached to the lifting-bars 26 26, which meet in connection at the point of the lifting-cranks 27 27, which lifting-cranks are secured to the crank-shaft 28, which shaft is actuated by an angling crank, 29, secured to the same shaft, and which crank 29 is moved by the connecting-rod 30, actuated by the controlling-lever 31, which moves through a segment-frame, 32, provided with stops, by which the lever is held at any position, at the will of the operator, the whole constituting a parallel-motion lifting combination, by which the plow and harrow frame is lifted or lowered perpendicularly and squarely with the least possible exertion on the part of the operator, the spiral springs constituting the lifting force, which is stored up by the lowering weight of the implement, and which can be adjusted to any degree of weight desired to be raised.

The seed-drill 22 is actuated by the gear-wheel 33, attached to one of the carriage-wheels. It is provided with one or more planting-hoes, 34, which may be adjusted to sow from the rod 35 at such distances apart as will cause the wheels of the carriage to track between the rows sown.

The dropping of the seed is cut off or started by the lever 36, and the planting-hoes are supported by the chain 37 at any desired depth. A rod, 38, attached to the plowing and harrowing frame, raises the planting-hoes clear of the earth, and suspends them from the carriage-frame at the same time as the plowing-frame comes up, thus enabling the operator, in one movement of the controlling-lever 31, to manipulate the entire implement.

The carriage-frame is provided with a large circular supporting ring, 39, for the purpose of properly supporting the plow and harrow frame, while admitting of the shortest possible turns.

Having thus stated my improvements, what I claim as my invention is—

1. The combination of a carriage-frame, of a frame carrying plowing and harrowing devices, and of the levers 23, lifting-bars 26, shackle-bars 25, lifting-cranks 27, and the shaft-crank, connecting-rod, and lever, as set forth.

2. In combination with the lifting apparatus and the suspended frame, the springs 24, arranged upon the bolts of the principal lever-bars 23, and operating with the controlling-lever, to raise the frame, as set forth.

3. The combination of a carriage-frame and combined plow and harrow frame with the lifting-springs 24, the principal levers 23, lifting-bars 26, the shackle-bars 25, lifting-cranks 27, crank-shaft 28, angling crank 29, connecting-rod 30, controlling-lever 31, and stop-frame 32, substantially as shown and described.

4. In a vertical wheel-harrow, the combination of transverse removable bars and the perforated rims, whereby the spaces are made adjustable in width, as set forth.

5. A vertical wheel-harrow, 2, in combination with a pulverizing-plate, 15, having hinged finger bars or cleaners 17 and springs 19, whereby obstructions which will not pulverize are passed without injury to the implement, substantially as shown and described.

6. The plow made laterally adjustable, in combination with the vertical wheel-harrow, the mold-board of the plow being adapted to the inner periphery of the harrow, as set forth.

7. A vertical wheel-harrow, 2, in combination with a plow, 4, made fast to a sliding beam, 5, sliding upon rods, as 6 6, and actuated by a screw, 7, and crank-handle 8, or similar device, all in connection with the common frame 1 1, whereby the amount of earth turned into the harrow may be regulated, substantially as described and shown.

8. The combination of a carriage of substantially the construction described, of a supplemental frame suspended on one side and carrying the plow and pulverizing-wheel, which operate in connection with each other, and of a seed-dropping device mounted on the opposite side, the whole apparatus operating to plow, pulverize, and plant at one operation, as set forth.

In testimony whereof I have signed my name to this specification in the presence of two subscribing witnesses.

CHAS. E. SACKETT.

Witnesses:
T. A. APPLEBY,
FRANK H. HARRISON.